INVENTOR
EUGENE FRED GOLLA
BY Brady, O'Boyle & Gates
ATTORNEYS

May 5, 1970 E. F. GOLLA 3,510,590

ELECTRONIC APPARATUS FOR QUANTIZING A DIGITAL INPUT SIGNAL FOR PROVIDING AN AUDIO OUTPUT SIGNAL THEREOF

Filed Sept. 19, 1967 4 Sheets-Sheet 3

May 5, 1970 E. F. GOLLA 3,510,590
ELECTRONIC APPARATUS FOR QUANTIZING A DIGITAL INPUT SIGNAL
FOR PROVIDING AN AUDIO OUTPUT SIGNAL THEREOF
Filed Sept. 19, 1967 4 Sheets-Sheet 4

United States Patent Office 3,510,590

Patented May 5, 1970

3,510,590

ELECTRONIC APPARATUS FOR QUANTIZING A DIGITAL INPUT SIGNAL FOR PROVIDING AN AUDIO OUTPUT SIGNAL THEREOF

Eugene Fred Golla, Kittanning, Pa., assignor to HRB-Singer, Inc., State College, Pa., a corporation of Delaware Filed Sept. 19, 1967, Ser. No. 668,916
Int. Cl. H03k 5/20, 13/24
U.S. Cl. 179—1 9 Claims

ABSTRACT OF THE DISCLOSURE

Communications apparatus for presenting an interpretation of a digital (binary) number to an operator by means of audio signals, comprising a binary signal counter and a reference counter coupled to sequencing means under the control of a clock signal, whereupon an input binary signal representing a binary number is compared against a reference number selected in the reference counter. A delta count circuit is coupled to both the counter and reference counter, the output of which is fed into a third binary counter circuit including memory means. A binary quantizer circuit is coupled to the third counter circuit which is operative to feed a control signal to an audio signal generator to produce a predetermined output in form of a combination of audio tones and low frequency pulses which are representative of the quantized binary input signal.

BACKGROUND OF THE INVENTION

There exist many applications where an output is provided in the form of a binary number and it is desirable to present an interpretation of this binary number to an operator by means of a signal which is directly communicated to one of the human senses such as sight, sound, and touch. Direct conversion of a large binary output into each discrete number may require a considerable amount of electrical equipment. In some instances, this requirement may place an intolerable limit on the size and weight of the electronics package, for example, communication with underwater swimmers.

Prior art apparatus is known for providing a humanly perceptible indication of the presence or absence of a pulsed radio signal. Such a teaching is disclosed in U.S. Pat. 3,061,795, issued to C. G. Byrd et al. entitled "Flip-Flop Varies Frequency of Blocking Oscillator." Also, U.S. Pat. 3,165,583, issued to E. R. Kretzmer et al., discloses a two tone transmission system for digital data. In neither of the above-mentioned patents, however, is there any suggestion of the inventive concept hereinafter set forth in the present invention.

SUMMARY OF THE INVENTION

Briefly, the subject invention comprises a binary signal counter and a reference counter coupled to sequencing means under the control of a clock signal whereupon an input binary signal representing a binary number is compared against a reference number selected in the reference counter. A delta count circuit is coupled to both the counter and reference counter, the output of which is fed into a third binary counter circuit including memory means. A binary quantizer circuit is coupled to the third counter circuit which is operative to feed a control signal to an audio signal generator to produce a predetermined output in the form of a combination of audio tones and low frequency pulses which are representative of the quantized binary input signal.

DESCRIPTION OF THE PREFERRED EMBODIMENT

Figures 1, 2:
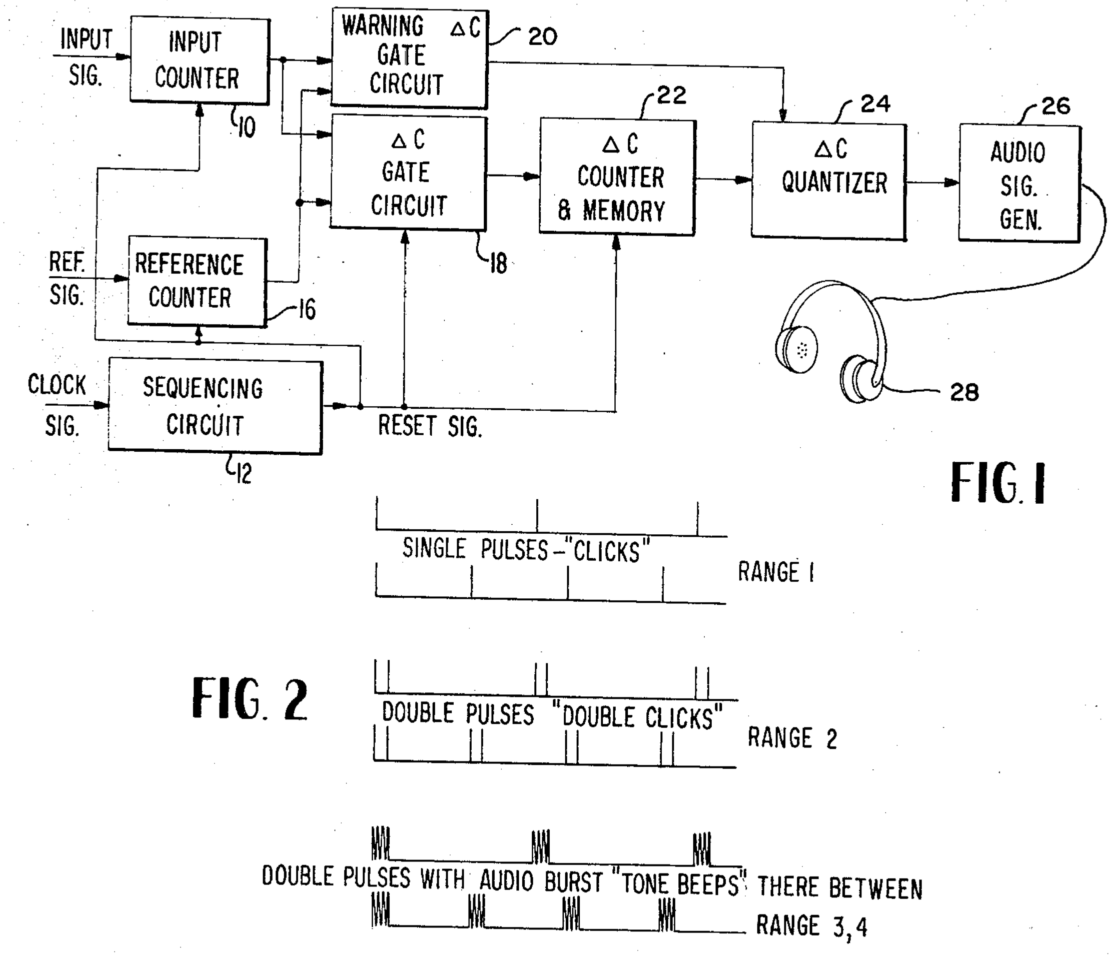
FIG. 1 is a block diagram illustrative of the preferred embodiment of the present invention.
FIG. 2 is a diagram of illustrative output signals from the embodiment shown in FIG. 1.

Referring to FIG. 1, an input signal comprising a binary number is applied to an input counter 10 which is periodically reset by means of a reset signal from a sequencing circuit 12 operating under the control of a clock signal applied thereto. A reference counter 16 receives a reference signal comprising a second binary number and is also periodically reset by means of the sequencing circuitry 12 in the same manner as the input counter 10. The outputs of the input counter 10 and the reference counter 16 are respectively coupled to a delta (Δ)C gate circuit 18. A reset signal from the sequencing circuit 12 is also simultaneously applied. The output of the delta C gate circuit 18 comprises the difference between the binary input signal applied to the input counter 10 and the reference binary number applied to the reference counter 16. This output is a positive count for the condition where the input binary number is greater than the reference binary number but is negative where the input binary number is less than the reference binary number. Both counters 10 and 16 preferably have an equal number of $n$ stages. By counting the number of pulses between the spill or dump of each counter, the difference number is comprised of the burst of pulses present. By monitoring which counter spills first it is possible to determine which number is larger. A delta C counter and memory circuit 22 is coupled to the delta C gate circuit 18 for providing a count ΔC which is fed into a delta C quantizer circuit 24. A signal of a predetermined read-out level or quantized step is produced therein which is a function of the ΔC input. The delta C quantizer 24 is coupled to an audio signal generator 26 which is operable to produce different audio output signals dependent upon the read-out level or quantized steps of the quantizer 24 output. Transducer means 28, such as a pair of headphones, is coupled to the audio sequence generator for producing a humanly perceptible signal which is a function of the binary input signal applied to the input counter 10.

Additionally, a warning delta C gate circuit 20 is coupled to the output of the input counter 10 when a binary input signal of a predetermined magnitude is applied as an input signal whereupon the delta C quantizer circuit 24 is fed an override "warning" signal which causes the audio signal generator to generate a specific audio signal indicative of an impending dangerous condition.

Figure 3:
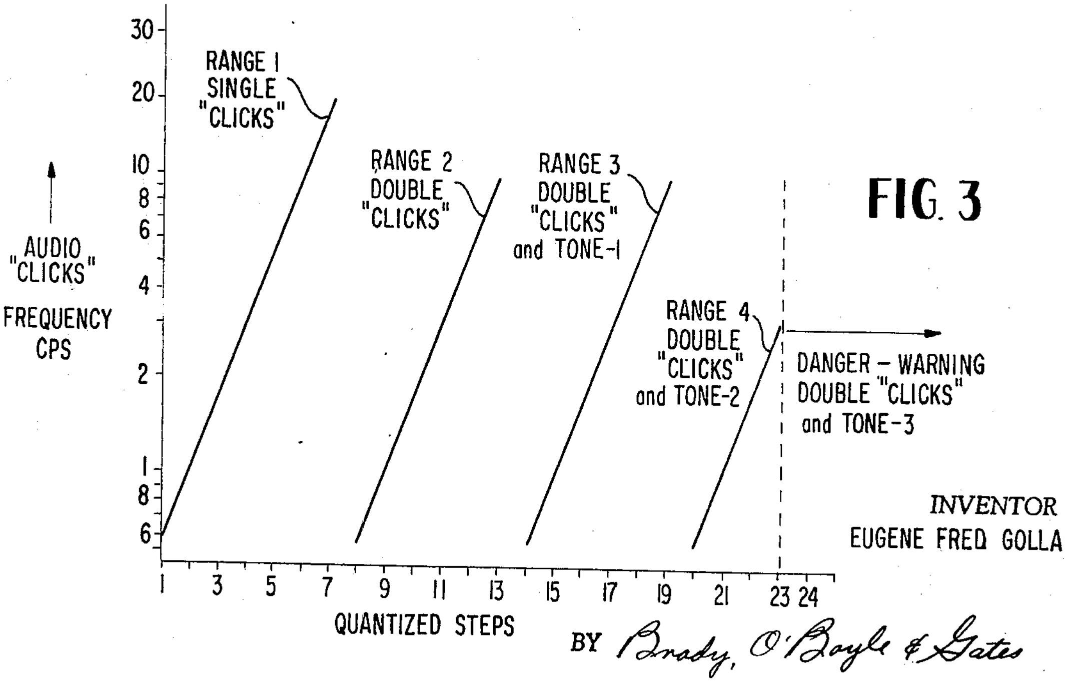
FIG. 3 is a graphic representation of the audio output produced by the subject invention in response to a quantized digital signal level or step.

In a specific application where it is desirable to provide a communications link with an underwater swimmer, the present invention provides a humanly perceptible audio output which is a direct function of the input binary number. FIGS. 2 and 3 are illustrative diagrams helpful in understanding the operation of the preferred embodiment disclosed in FIG. 1 and indicates that the audio output signal from the signal generator 24 is comprised of low frequency pulses or "clicks" or a combination of "clicks" and audio tones. For example, FIG. 2 indicates that for a Range 1 the audio signal output comprises single pulses or "clicks" of varying frequency. Reference to FIG. 3 further indicates that Range 1 exists for quantized steps from 1 to 7 and the frequency of the "clicks" changes from 6 cycles per second to approximately 20 cycles per second. Range 2, which FIG. 3 indicates exists from quantized steps between 8 and 13, provides an output of "double clicks" that range between the frequency of 6 cycles per second and 10 cycles per second, respectively. Because of the limited number of steps available in the human hearing threshold of audio clicks, it is necessary to provide further stimuli in order to cover additional quantized levels. Accordingly, Ranges 3 and 4 produce outputs consisting of "double clicks" spaced approximately 15 milliseconds apart with audio tones of a first and second frequency, respectively, present during the intervals between each click of a pair. In each of the Ranges 3 and 4, the frequency of the "double clicks" varies in the same fashion as described with respect to Ranges 1 and 2. For a predetermined upper quantized level, a "warning" tone 3 is incorporated with the double clicks to indicate the presence of a harmful condition.

Figure 4:
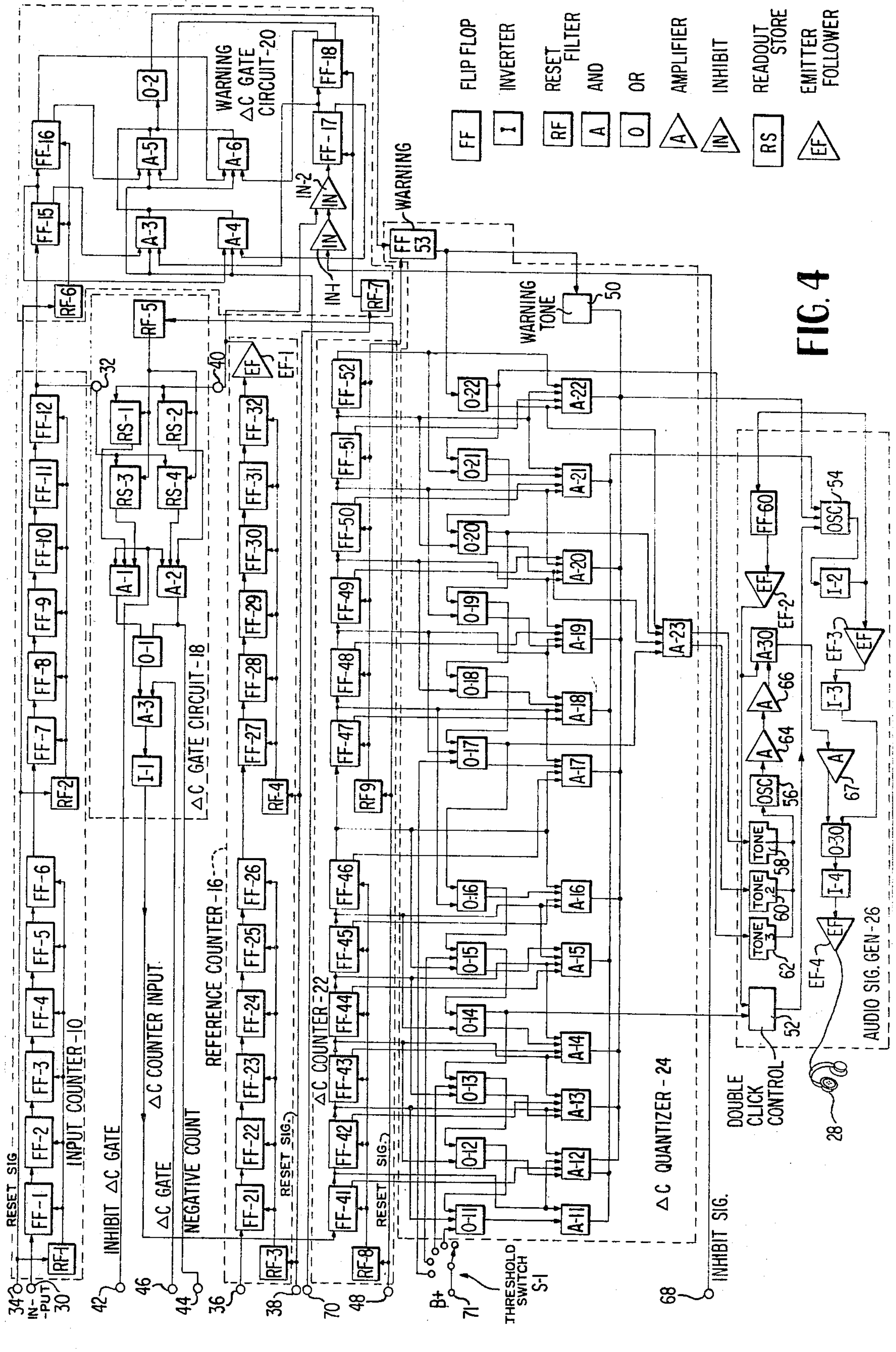
FIG. 4 is a detailed block diagram of the preferred embodiment of the subject invention shown in FIG. 1.

Directing attention now to FIG. 4, there is disclosed a detailed block diagram of the simplified block diagram shown in FIG. 1. The input counter 10 is comprised of twelve flip-flops FF–1 through FF–12 coupled together in cascade circuit relationship with the input binary signal being coupled to FF–1 through terminal 30 and the output being coupled to the delta C gate circuit 18 from FF–12 and terminal 32. A reset signal is coupled into the input counter 10 at terminal 34 and by means of reset filters RF–1 and RF–2. The reset signal is applied to the first six flip-flops through reset filter RF–1 while the second six flip-flops receive the reset signal through reset filter RF–2. The reference binary number is coupled into the reference counter 16 by means of terminal 36 while the reset signal is applied through terminal 38. The reference counter 16 is similar to the input counter 10 in that it is comprised of 12 flip-flops FF–21 through FF–32 and two reset filters RF–3 and RF–4. The output of FF–32, however, is coupled into a transistor emitter follower circuit EF–1. The output of the emitter follower 40 is coupled to the delta C gate circuit 18 through terminal 40.

The delta C gate circuit 18 is comprised of four readout stores RS–1 through RS–4, three AND circuits A–1 through A–3, one OR circuit O–1 and an inverter circuit I–1. The input counter 10 has its output commonly coupled to the reset stores RS–3 and RS–4 while the reference counter 16 has its output commonly coupled into reset stores RS–1 and RS–2. The AND gate A–1 has inputs applied from reset stores RS–1 and RS–3 and additionally receives an inhibit gate "inhibit ΔC" from terminal 42. The other AND gate A–2 receives input from the reset stores RS–2 and RS–4 as well as the inhibit ΔC gate from terminal 42. The outputs of AND gates A–1 and A–2 are fed to the OR gate O–1. The output of the AND gate A–2 also provides a negative count output which is coupled to terminal 44. An enabling gate signal "ΔC gate" is coupled to terminal 46 and applied to one input of the AND gate A–3. Its other input is received from OR gate O–1. The ΔC signal is inverted in the inverter circuit I–1 and applied to the delta C counter and memory circuitry 22. The delta C counter and memory 22 is substantially identical to the input counter 10 and the reference counter 16 and is also comprised of 12 flip-flop circuits FF–41 through FF–52 and 2 reset filters RF–8 and RF–9. The output from the inverter I–1 is applied to the first flip-flop RF–41. The reset signal is applied to the reset filters 8 and 9 via terminal 48. The flip-flops FF–41 through FF–52 in addition to being serially connected each have a respective output coupled to the delta C quantizer circuit 24. The quantizer circuit 24 is comprised of twelve OR circuits O–11 through O–22 and thirteen AND circuits A–11 through A–22. Additionally, a warning flip-flop FF– 53 has a trigger input applied from the warning delta C gate circuit 20 and has its output connected to the OR circuit O–22 and a warning tone gate circuit 50.

A threshold switch S–1 is adapted to selectively couple B+ supply potential to OR circuits O–11, O–13, O–15 and O–17. The output of flip-flop FF–42 feeds into the OR circuit O–11 and the AND circuits A–12 and A–13. In a similar manner, the other flip-flops FF–41 and FF–43 to FF–52 in the delta C counter circuit 22 are coupled into the delta C quantizer circuit 24 so that a selected ΔC count is fed into the OR and AND gate configuration comprising the delta C quantizer 24. An output is provided from one of the AND circuits A–11 through A–23 which is then fed to the audio signal generator circuit 26.

The audio signal generator 26 includes a double click control circuit 52 having an energizing input coupled thereto from the OR circuit O–14. Another input is also received from the emitter follower EF–2. A "click" oscillator 54 is coupled to the double click control circuit 52 and the AND circuits A–11 through A–22 in an alternate sequence. The output of the "click" oscillator 54 is coupled into an inverter circuit I–2. This output is then fed through emitter follower EF–3, another inverter circuit I–3, OR circuit O–30, still another inverter I–4 and finally through an output emitter follower EF–4 to the earphones 28. For any output of the delta C quantizer circuit 24 prior to the OR circuit O–14, wherein the double click control circuit 52 is energized, Range 1 comprising a single click output is generated in the oscillator 54. However, upon the occurrence of an output signal at OR circuit O–14, a double click output signal is produced thereby generating Range 2 signals.

A second or "tone" oscillator circuit 56 is included in the audio signal generator circuitry 26 and is controlled by three frequency determining circuits 58, 60 and 62 corresponding to desired tones 1, 2 and 3. The oscillator 56 generates tones 1 and 2 when the AND circuit A–23, which is a dual AND circuit, receives a selected pair of inputs from OR circuits O–17, O–20 and O–22. The third tone is generated in response to the output from OR circuit O–22 which produces an output in response to the output of the warning flip-flop FF–53. The output of the tone oscillator 56 is coupled through amplifiers 64 and 66 to an AND circuit A–30. The other input to the AND circuit A–30 is received from emitter follower EF–2 which is coupled to the flip-flop circuit FF–60. The flip-flop FF–60 is triggered by means of the output of the inverter circuit I–2 and the oscillator 54 giving rise to the combination of "double clicks" and a "tone" between each click of a click pair.

For a quantized step greater than the output providing a Range 4 audio output comprising a double click and tone-2, the warning delta C gate circuit 20 is employed. The warning delta C gate circuit 20 is comprised of four flip-flop circuits FF–15 through FF–18, two inhibit circuits IN–1 and IN–2, four AND circuits A–3 through A–6, and an OR circuit O–2. The output of the input counter 10 is coupled thereto from FF–12 to FF–15. The reference counter 16 output from the emitter follower EF–1 is coupled to the second inhibit circuit IN–2. The first inhibit circuit IN–1 receives inhibit signal applied to terminal 68. A reset signal is coupled to the reset filter RF–7 which receives a reset signal coupled terminal 38. An enabling signal for the warning delta C gate circuit 20 is coupled to terminal 70.

When the delta C count is of a predetermined magnitude, the delta C gate circuit 20 is automatically rendered operative to provide an output signal from the OR circuit O–2 which triggers the warning flip-flop FF–53 in the delta C quantizer circuit 24, at which time OR circuit O–22 feeds a signal to the tone control circuit 62 and the warning tone enabling gate 50 is coupling a signal to the click oscillator 54. The warning tone circuitry 50, when activated by the warning flip-flop FF–53, controls the frequency of the double click oscillator 54 whereas the output of the OR circuit O–22 activates the tone control circuitry 62 to generate a warning or "panic" tone in the oscillator 56.

It can be seen, therefore, that when the input binary signal is fed into the input counter 10 and compared against a reference binary number fed into the reference counter 16, either the delta C gate circuit 18 or the warning delta C gate circuit 20 is rendered operative to feed a ΔC count into the delta C quantizer 24. The quantizer 24 then provides one of a plurality of outputs to activate specific circuitry either singly or in combination in the audio signal generator 26 to produce different audio output signals for the quantized input applied thereto.

Figure 5:
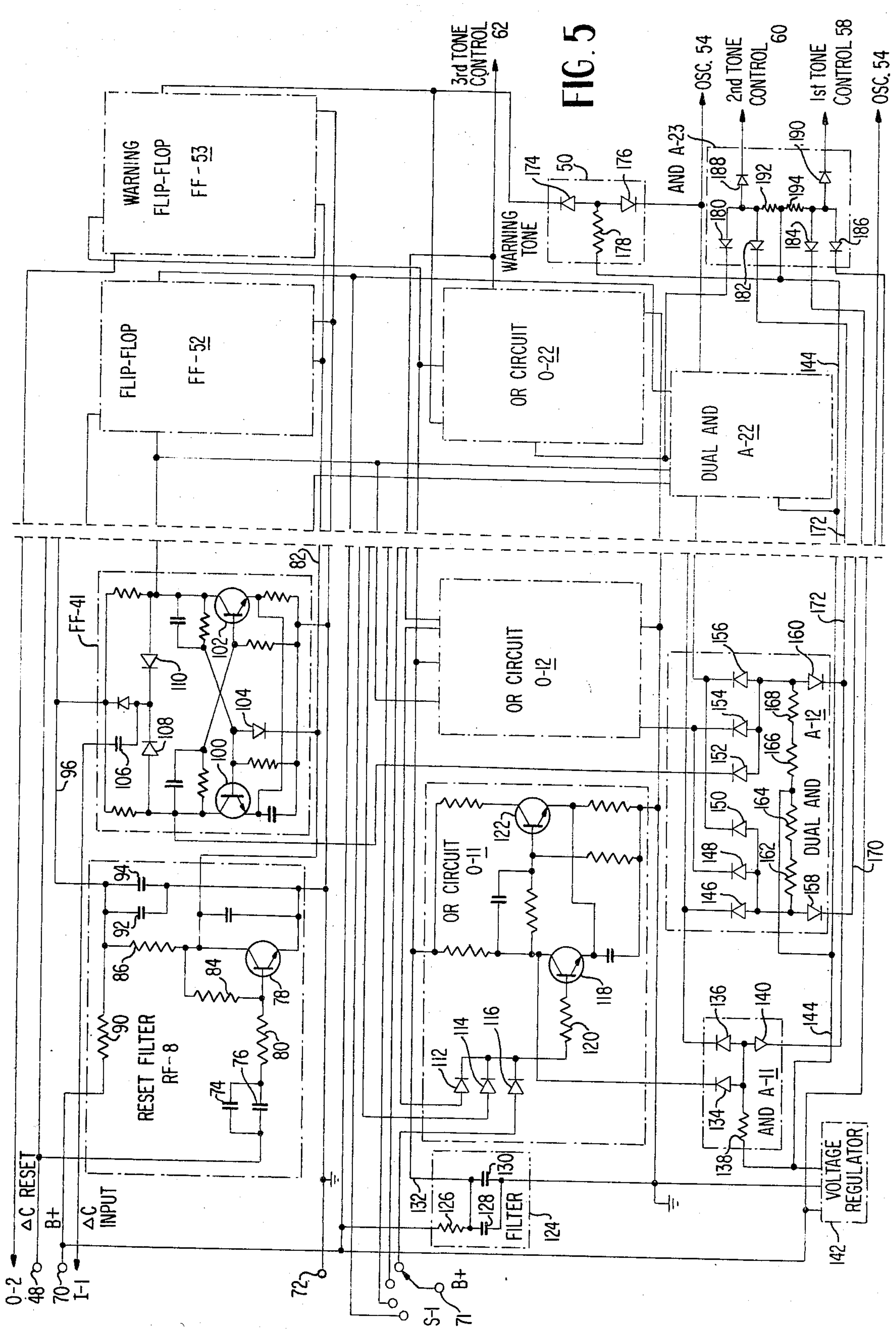
FIG. 5 is a partial schematic diagram of the delta (Δ)C counter and delta (Δ)C quantizer circuitry of the embodiment shown in FIG. 4.

Referring now to FIG. 5, a partial schematic diagram of the delta C counter 22 and delta C quantizer 24 is illustrated. Reset filter RF–8 is shown comprising a pair of capacitors 74 and 76 connected in parallel to the delta C reset terminal 48. The delta C reset signal is applied to the base of the transistor by means of resistor 80 coupled to the capacitors 74 and 76. The reset signal, inverted and amplified, is coupled from the collector of transistor 78 to circuit bus lead 82. Resistors 84 and 86 provide base bias for the transistor 78, and resistor 86 additionally acts as the collector load. A B+ supply potential is supplied to terminal 70 from a source not shown, and is coupled to the reset filter RF–8 by means of resistor 90. The B+ potential is additionally filtered by means of capacitors 92 and 94 and applied to the circuit bus 96.

A typical flip-flop circuit FF–41 is shown in detail and comprises transistors 100 and 102. The reset signal appearing on circuit bus 82 is coupled to the flip-flop circuit by means of diode 104 while the ΔC input from the inverter circuit I–1, not shown, is applied by means of capacitor 106 and steering diodes 108 and 110. The output from flip-flop FF–41 is taken from the collector of transistor 102 and applied to the succeeding flip-flop FF–42, not shown. Shown in phantom section is the last flip-flop FF–52 and the warning flip-flop FF–53.

Typical OR and AND circuits are additionally shown in schematic form. For example, OR circuit O–11 is comprised of three input diodes 112, 114 and 116 coupled to the base of transistor 118 through base resistor 120. Diode 116 is coupled to switch S–1 having a B+ potential applied by means of terminal 71. Diodes 112 and 114 are coupled, respectively, to the OR circuit O–12 and AND circuit A–13, not shown. The output of the OR circuit O–11 is taken from the collector of transistor 118 and fed to the AND circuit A–11. The OR circuit O–11 additionally includes a second transistor 122 whose collector output as shown is not utilized for OR circuits of the type designated O–12 through O–22. The B+ supply potential applied to terminal 70 is coupled to the collector of transistor 118 of OR circuit O–11 through a B+ filter circuit 124 comprising resistor 126 and capacitors 128 and 130. The first AND circuit A–11 in the delta C quantizer circuit 24 is shown comprising diodes 134, 136, resistor 138 and output diode 140. Resistor 138 is coupled to a voltage regulator circuit 142 which provides a regulated supply potential on circuit bus 144. The diode 134 is coupled to the collector of transistor 118 in the OR circuit O–11 and the diode 136 is coupled to the second AND circuit A–12.

The second AND circuit A–12 of the delta C quantizer circuit 124 is a dual AND circuit comprising diodes 146, 148, 150, 152, 154 and 156. The diodes 146–150 comprise one-half of the diodes and additionally include an output diode 158, whereas diodes 152–156 comprise the second half of the AND circuit and additionally include output diode 160. Resistors 162, 164, 166, and 168 are connected in series between diodes 146 and 156 with the regulator supply bus 144 being coupled to the common connection between resistors 164 and 166. The diode 146 is commonly coupled to diode 136 in AND circuit A–11 while diode 148 is commonly coupled to the output of OR circuit O–12 and diode 154. Diode 150 is coupled to the flip-flop FF–42, not shown, and diode 156. Output diode 158 is coupled to output bus 170 while diode 160 is coupled to an output bus 172. Both output buses 170 and 172 are coupled to the input of oscillator 54 of the audio signal generator as shown in FIG. 4.

Also shown in detail is the warning tone gate circuit 50 shown comprising diodes 174 and 176 and resistor 178. Diode 174 is coupled to the output of the warning flip-flop FF–53 while the second diode 176 is coupled to the oscillator 54 shown in FIGURE 4. B+ supply potential is supplied as bias to diodes 174 and 176 through resistor 178.

The last AND circuit A–23 also comprises a dual AND circuit; however, only two pairs of input diodes are included, namely, diodes 180, 182, 184 and 186. Two output diodes 188 and 190 are coupled to the second and first tone controls 60 and 58, respectively. FIGURE 4 indicates that diode 180 is coupled to the output of OR circuit O–22, diode 182 is coupled to the output of OR circuit O–20, diode 184 is coupled to AND circuit A–20 and diode 186 is coupled to OR circuit O–17. Two bias resistors 192 and 194 are coupled to the positive supply bus 144 at their common connection.

As is well known to those skilled in the art, an OR circuit is operative to produce an output when any of the multiple inputs are applied, whereas an AND circuit provides an output only when all of the required inputs have signals applied thereto.

Figure 6:
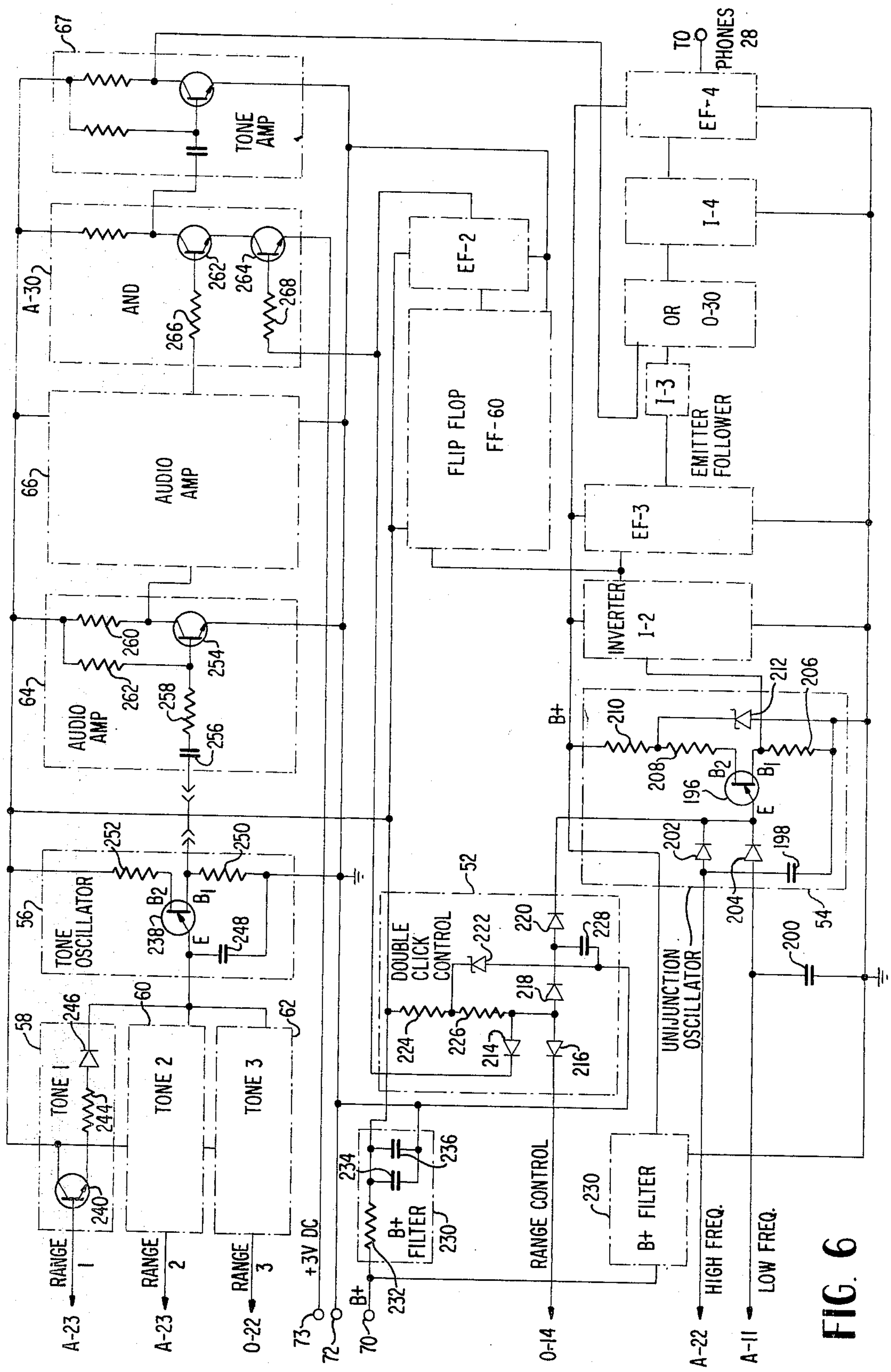
FIG. 6 is a partial schematic diagram of the audio signal generator circuitry of the embodiment shown in FIG. 4.

Considering now the audio signal generator 26 in additional detail, FIG. 6 discloses portions of the circuitry illustrated in FIG. 4. For example, the "click" generator 54 is shown comprising a unijunction relaxation oscillator including a unijunction transistor 196. Coupled to the emitter by means of steering diodes 202 and 204 are two frequency controlling capacitors 198 and 200. Capacitor 198 and diode 202 are coupled to the AND circuit A–22, not shown, for providing a high frequency output at base $B_1$ of unijunction transistor 196, while capacitor 200 and diode 204 are coupled to AND circuit A–11 for providing a low frequency. The base $B_1$ has a load resistor 206 coupled to ground. Two resistors 208 and 210 are connected in series between the base $B_2$ and a B+ supply potential. A Zener diode 212 is connected to ground from the common connection between resistors 208 and 210 for providing a stabilized supply voltage. Also coupled to the emitter of the unijunction transistor 196 is the "double click" control circuitry 52 which comprises four diodes 214, 216, 218 and 220. The input to the double click control circuitry is applied to the anode of diodes 214 and 216 from the OR circuit O–14, not shown, and the emitter follower EF–2. The output is taken from the anode of diode 220. A Zener diode 222 is coupled to the common connection between resistors 224 and 226 and ground, thereby providing a stabilized bias for the diodes. A bypass capacitor 228 is coupled to ground from the common connection between diodes 218 and 220.

A supply potential B+ filter 230 is coupled to terminal 70 and comprises a resistor 232 connected in series to capacitors 234 and 236 connected together in parallel to ground from one side of the resistor 232. The other side of the resistor 232 is connected to the unfiltered B+ supply potential supplied to terminal 70.

The "tone" oscillator 56 is shown comprising a second unijunction transistor 238, the emitter of which is coupled to the three tone control circuits 58, 60 and 62. Each of the tone control circuits is comprised of a transistor 240 operating as an emitter follower with the bases respectively connected to AND circuit A–23 and OR circuit O–22. The emitter of transistor 240 is connected to a resistor 244 in series with a diode 246. A capacitor 248 is connected from the emitter of unijunction transistor 238 to ground such that the combustion of resistor 244 and capacitor 248 determines the frequency of oscillation of the unijunction transistor oscillator. The output of the tone oscillator 56 is of a predetermined frequency depending upon which of the tone control circuits 58, 60 or 62 is selectively energized. The output from the tone oscillator 56 is taken from the base $B_1$ across resistor 250. The supply potential B+ is coupled to the base $B_2$ by means of resistor 252.

The tone oscillator output from base $B_1$ of unijunction transistor 238 is coupled to the audio amplifier 64 which is shown comprising a single transistor amplifier stage including transistor 254 which has the input signal coupled to the base by means of a series combination of capacitors 256 and resistor 258. The emitter of transister 254 is connected directly to ground and the output is taken from the collector which has B+ supplied thereto by means of the collector load resistor 260. The base is biased from the B+ supply potential through resistor 262. The output of the audio amplifier 64 is coupled from the collector of transistor 254 into a second audio amplifier 66 which comprises a substantially identical circuit. The output of amplifier 66 is coupled to AND circuit A–30 which is comprised of two transistors 262 and 264 connected together in cascade connection between the B+ supply potential and +3 v. DC voltage applied to terminal 73. The other input to the AND circuit A–30 is fed from the emitter follower EF–2 to the base of transistor 264 through resistor 268. The output of the AND circuit A–30 is taken from the collector of transistor 262 and applied to a tone amplifier 67 which is identical to the audio amplifier 64. The output of the tone amplifier is coupled into the OR circuit O–30 which had another input applied thereto from emitter follower EF–3 which comprises the "click" output from unijunction oscillator 54 and the flip-flop FF–60. The OR output from the OR circuit O–30 is coupled through the inverter circuit I–4 and the emitter follower EF–4 to the headphones 28 as shown in FIG. 4.

The above-described circuitry is operable to quantize a binary input signal and depending upon the quantized level produced a specific audio output is produced. The highest binary element of the input binary number is determined and a comparison is made to determine the highest binary level and the next lower binary level. The presence of the highest binary level automatically rejects any output from the quantizer circuits of a lower order. Thus, each binary level and the next lower order binary level determines one of two possible quantized output levels. Further, the highest binary level to be activated automatically rejects any quantized output from lower order binary levels. Connection of these quantized outputs to the desired output stimuli in the audio signal generator presents a quantized interpretation of the input number. Thus the highest binary element of the binary number as well as any contribution from the next lower binary element is used to determine the proper output quantized level.

I claim:

1. Electrical apparatus for converting a digital input signal to a quantized signal and providing an audio signal which is humanly perceptible in accordance therewith, comprising in combination:

first digital counter means including input means for receiving a digital input signal;

second digital counter means including input means for receiving a digital reference signal;

sequencing means, responsive to a clock signal, coupled to said first and said second counter means for periodically resetting both said counter means;

gate circuit means coupled to said first and second counter means and being responsive to the output thereof to gate out a difference signal between said digital input signal and said digital reference signal;

third counter means coupled to said gate circuit means, being responsive to said difference signal to provide an output signal indicative thereof;

quantizing circuit means coupled to said third counter means and providing a predetermined output level signal of a plurality of output levels in response to said output signal from said third counter means;

audio signal generator circuit means coupled to said quantizing circuit means, being responsive to said output level signal to produce a selected electrical output signal in the audio frequency range;

and transducer means coupled to said audio signal generator circuit means for providing a humanly perceptible signal in response to said electrical output signal generated by said audio signal generator circuit means.

2. The invention as defined by claim 1 wherein said third counter means includes memory circuit means for selectively storing said difference signal until such time that a resetting signal is coupled thereto from said sequencing means.

3. The invention as defined by claim 1 wherein said first, second and third counter means are comprised of a plurality of serially connected flip-flop circuits.

4. The invention as defined by claim 1 and additionally including second gate circuit means coupled to said first and said second counter means and being responsive to a predetermined output to produce a signal for energizing said quantizing circuit means to produce a selected output level for providing a warning output signal by said audio signal generator circuit means.

5. The apparatus as defined by claim 1 wherein said quantizing circuit means comprises logic circuit means comprising a plurality of AND and OR logic circuits.

6. The apparatus as defined by claim 1 wherein said transducer means comprises an audio producing device operable to transmit sound waves to an operator.

7. The invention as defined by claim 1 wherein said audio signal generator circuit means includes first gated oscillator means responsive to a first range of output levels to selectively produce a single low frequency pulse or click having a variable frequency and responsive to a second range of output levels to selectively produce a double low frequency pulse output or double click, a second gated oscillator means acting in combination with said first gated oscillator means being responsive to a third range of output levels for providing an output signal comprising a double pulse output having an audio tone appearing between the first and second click of said double pulse output.

8. The apparatus as defined in claim 7 wherein said first and said second gated oscillator means comprises a unijunction transistor oscillator.

9. The apparatus as defined by claim 7 wherein said audio signal generator means additionally includes a double click control circuit coupled to said first gated oscillator means from said quantizer circuit means for selectively producing single and double pulse outputs in said first and second ranges, and a plurality of tone control circuits coupled to said second gated oscillator circuit means from said quantizing circuit means for producing a selective tone between pulses of said double pulse output in said third range.

No references cited.

KATHLEEN H. CLAFFY, Primary Examiner

C. JIRAUCH, Assistant Examiner

U.S. Cl. X.R.

235—154; 307—233, 261; 328—34, 134; 340—347